United States Patent [19]

Hamada et al.

[11] Patent Number: 4,855,993

[45] Date of Patent: Aug. 8, 1989

[54] METHOD AND APPARATUS FOR DETECTING A FAULT IN A RING NETWORK DATA TRANSMISSION SYSTEM

[75] Inventors: Takuji Hamada, Hitachiota; Masahiro Takahashi, Hitachi; Katsuhiko Yoneda, Hitachi; Ken Onuki, Hitachi; Toshihiko Uchiyama, Hitachi, all of Japan

[73] Assignee: 501 Hitachi, Ltd., Tokyo, Japan

[21] Appl. No.: 158,696

[22] Filed: Feb. 22, 1988

[30] Foreign Application Priority Data

Feb. 23, 1987 [JP] Japan ................... 62-37952

[51] Int. Cl.$^4$ .............................................. H04L 1/12
[52] U.S. Cl. .......................................... 370/16; 370/15
[58] Field of Search ................... 370/13.1, 14, 15, 16, 370/17, 88; 340/825.16

[56] References Cited

U.S. PATENT DOCUMENTS

| | | | |
|---|---|---|---|
| 4,573,044 | 2/1986 | McConachie et al. | 370/16 |
| 4,594,709 | 6/1986 | Yasue | 370/16 |
| 4,769,807 | 9/1988 | Niwa et al. | 370/15 |

FOREIGN PATENT DOCUMENTS 60-137154 7/1985 Japan .

Primary Examiner—Douglas W. Olms
Assistant Examiner—Melvin Marcelo
Attorney, Agent, or Firm—Kenyon & Kenyon

[57] ABSTRACT

A ring network data transmission system includes a plurality of transmission apparatuses, at least one terminal connected to each of the transmission apparatuses and double ring transmission paths interconnecting the transmission apparatuses in a ring-like system configuration so that terminals can communicate with one another through the associated transmission apparatuses. When a transmission fault occurs in the network, the transmission apparatus which can serve as the master station issues to all of the other transmission apparatuses a command for searching the fault location. In response to the reception of the command, each of the other transmission apparatuses sends out a monitor signal containing its own address and at the same time checks monitor signal received. Through collation of the address contained in the received monitor signal with the address information arrayed in the order in which the transmission apparatuses ae interconnected, the number of bypassed transmission apparatuses existing between each transmission apparatus and the transmission apparatus sending out the monitor signal is determined. By comparing this number with a predetermined maximum permissible number of the stages allowable to be bypassed, the faulty location is detected. With such an operation, automatic reconfiguration operation of double ring configuration can be stabilized.

9 Claims, 11 Drawing Sheets

SYN : SYNCHRONIZING PATTERN
DA  : ADDRESS OF ADDRESSEE
SA  : ADDRESS OF SENDER
TYP : TYPE OF COMMAND
SUB : SUB-INFORMATION

SAO : TABLE OF ADDRESSES ARRAYED IN STATION CONNECTING ORDER

ABY : TABLE CONTAINING MAXIMUM PERMISSIBLE STAGE NUMBERS TO BE BYPASSED IN PATH A UPSTREAM

BBY : TABLE CONTAINING MAXIMUM PERMISSIBLE STAGE NUMBERS TO BE BYPASSED IN PATH B UPSTREAM

MSA : ADDRESS OF ASSOCIATED TRANSMISSION APPARATUS

METHOD AND APPARATUS FOR DETECTING A FAULT IN A RING NETWORK DATA TRANSMISSION SYSTEM

BACKGROUND OF THE INVENTION

The present invention relates in general to a method and an apparatus for reconstituting or reconfiguring a ring network including a plurality of transmission nodes for allowing communication between terminals connected thereto. More particularly, the present invention is concerned with a network reconfiguring method and an apparatus which are suited for detecting a faulty location where the transmission apparatuses are by-passed by optical switches or the like means, involving section or interval loss greater than a predetermined level that may cause the operation of the ring network to be unstable, and/or for disconnecting the faulty location from the system or reconnecting it to the system after the fault is recovered.

A method for reconstituting or reconfiguring a transmission path reconstituting for a ring network data transmission system, is disclosed in an article entitled "A 100 Mb/s Optical Local Ring Network which interconnects plural Bus Networks" contained in a Japanese literature "Nikkel Electronics" Dec. 5, 1983, pp. 173-199. According to this known method, occurrence of transmission fault or failure is detected by a master station, which then issues a command signal commanding a search for the faulty location to the other stations, whereupon each station as well as the master station, checks whether the adjacent station the faulty station, which is then followed by issuance of a command to the faulty adjacent station as detected for transition to a loopback state. However, in the case of this known system, no consideration is made to the disconnection of an unstable location brought about by bypassing a multiplicity of successive stages of the transmission apparatuses, not to speak of the much complicated structure of the detecting means for detecting the unstable state and the amount of time required for the reconstitution (reconfiguration) of the network system.

Further, there is disclosed in Japanese Patent Application Laid-Open No. 137154/1985 (JP-A-60-137154) a transmission path reconstituting method for dealing with the unstable transmission state brought about by signal loss of a magnitude greater than a permissible value in a section where a number of successive transmission stations (apparatuses) are bypassed, i.e. the unstable state in which the transmission error rate is increased beyond a prescribed value or varies significantly in dependence on changes in the environmental conditions. In the case of this known system, however, the message, for example, the power-down of the power of a transmission apparatus is given to the adjacent apparatus through a line provided additionally only for this purpose. Consequently, overall system cost is undesirably increased due to the necessity of providing the abovementioned message line in addition to the inherent transmission lines, giving rise to a problem.

SUMMARY OF THE INVENTION

It is therefore an object of the present invention to provide a method and an apparatus for detecting a faulty location in a ring network transmission system to thereby disconnect the faulty location from the system by reconstituting the system configuration such that an instability is eliminated, when the transmission quality is deteriorated beyond a prescribed interval loss, by utilizing only a loopback technique without resorting to the use of an additional separate line for a state message.

In view of the above and other objects which will be more apparent from the description below, there is provided, according to an aspect of the present invention, a network configuration reconstituting system for a ring network data transmission system in which upon occurrence of a transmission fault, a transmission apparatus serving as a master station issues a fault searching command to all of the other transmission apparatus stations. In response, each of the transmission apparatuses sends out a monitor signal containing its own address and at the same time checks the received monitor signal from the other station. For making a decision as to whether a transmission apparatus is to be set to the loopback state, a table containing addresses of the transmission apparatuses in the order in which they are connected in the ring network is consulted to determine arithmetically the number of repeating stages by-passed before reaching the currently adjacent transmission apparatus, whereupon the abovementioned number is compared with a maximum permissible number of the stages allowable to be by-passed which number is also stored previously. With such arrangement, the faulty portion of the location being bypassed can be disconnected from the transmission network system, whereby the system can be positively protected against the unstable operation.

DETAILED DESCRIPTION

Figure 1:
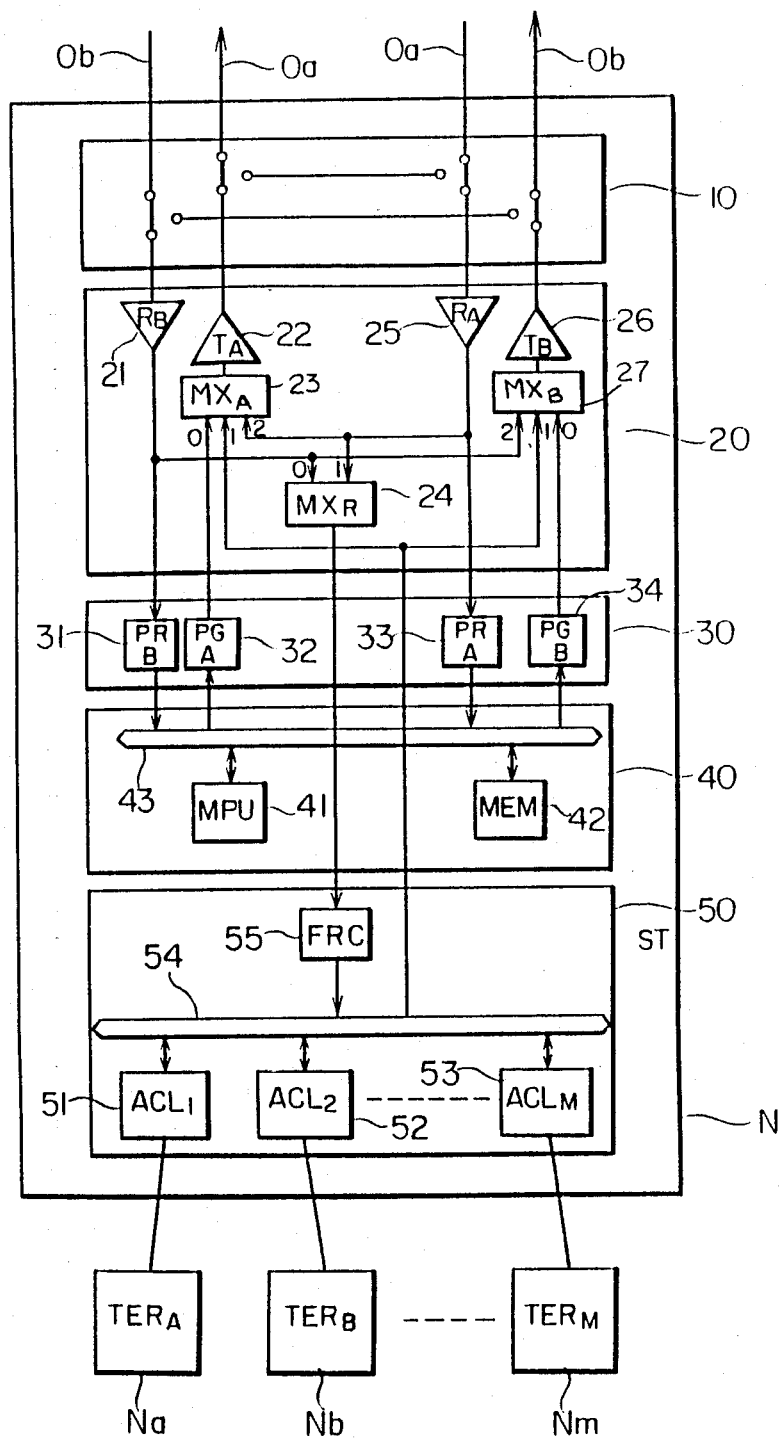
FIG. 1 is a block diagram showing a hardware arrangement of a transmission apparatus according to an exemplary embodiment of the present invention, which apparatus is destined to be connected in a ring network transmission system together with other transmission apparatus of the identical structure.

Now, the present invention will be described in detail in conjunction with exemplary and preferred embodiments thereof by referring to the drawings.

Figure 2:
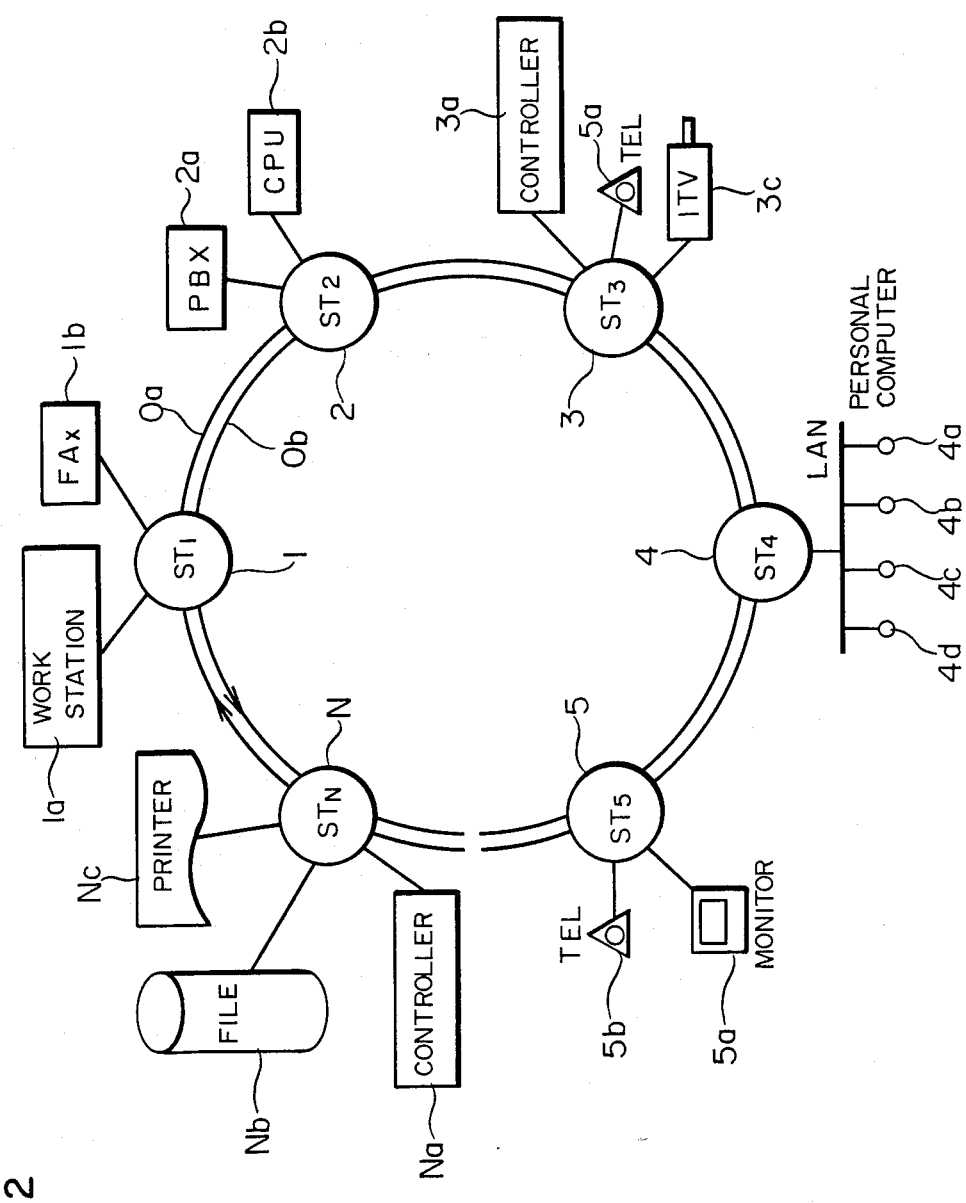
FIG. 2 is a view showing a system structure of a local ring data transmission network to which the invention can be applied.

FIG. 2 schematically shows a general configuration of a typical local ring network data transmission system having double ring transmission lines $O_a$ and $O_b$ and including transmission apparatuses $ST_1$ to $ST_N$ (they are each also referred to a transmission station or stage) to which the present invention can be applied. As will be seen in the figure, information terminals la to Nc of various types installed distributively in the premises are connected to the ring transmission lines $O_a$ and $O_b$ (each constituted, for example, by optical fiber) by way of the respective transmission apparatus la to Nc, whereby a ring network is formed as a whole so that communication can be carried out among the individual terminals la to Nc.

The network of this type functions, so to say, as a nervous system and bears increasingly greater importance as the data processing technology advances. In the ring network system, each information terminal can make use of the transmission lines with high efficiency, to a great advantage. On the other hand, a drawback is also seen in that influence of a transmission trouble tends to spread over a large area. With a view to increasing the reliability of the ring network of this type, bypass and loopback techniques are widely adopted. The effectiveness of these techniques depends on the types of transmission troubles. Accordingly, adoption of both the bypass and loopback techniques in combination is preferred over the use of only one such technique.

With the present invention, the local ring network of high reliability as mentioned above is envisaged as the object to which the invention is to be applied.

FIG. 1 shows in a hardware block diagram an arrangement of a data transmission apparatus according to an exemplary embodiment of the present invention, which apparatus is applied to a double ring transmission network system mentioned above. The transmission apparatus N shown in FIG. 1 is a typical one representative of the individual transmission apparatuses 1 to N in the ring network system shown in FIG. 2 and is constituted generally by five major function blocks 10, 20, 30, 40 and 50 described below.

As the first function block, there can be mentioned a bypass circuit 10 which is realized by two sets of optical switches in correspondence with the transmission lines $O_a$ and $O_b$ and used for disconnecting the transmission apparatus N from the transmission lines upon occurrence of trouble a fault. Although no operation control lines for the optical switches are shown, it will be appreciated that the bypass circuit can be actuated automatically in response to the occurrence of a fault or trouble such as a shutdown of the power supply or failure of hardware or a shutdown through manual operation.

Second, a route change-over circuit 20 is provided for changing the intra-apparatus routes for the signal incoming from the transmission path and information signal generated by the sender described below. Ordinarily, only one of the routes is used for communication between the terminals with the other being set to a standby state as a reserve or spare route. More specifically, the route change-over circuit 20 is composed of receivers 21 ($R_B$) and 25 ($R_A$) each having functions such as, for example opto-electrical (light-to-electric signal) conversion, retiming, demodulation transmitters 22 ($T_A$) and 26 ($T_B$) having functions such as demodulation, electrooptical (electric-to-light signal) conversion, two multiplexers or selectors 23 ($MX_A$) and 27 ($MX_B$) for transmission and a multiplexer (selector) 24 ($MX_R$) for reception. Select command for the individual multiplexers are provided by a configuration control circuit 40 which will be described in detail hereinafter.

Figure 3:
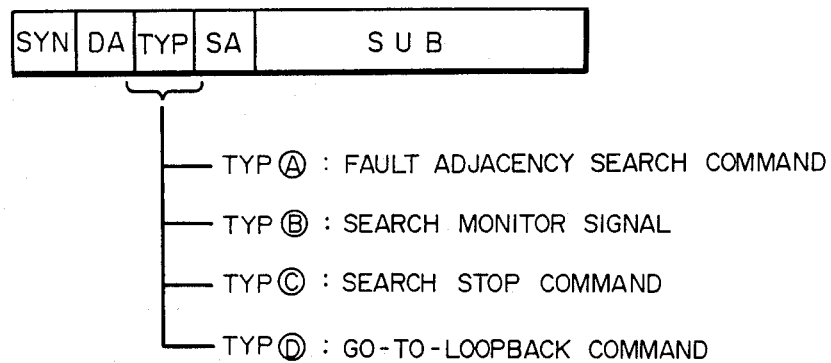
FIG. 3 is a diagram showing a format of the information which is transferred between configuration control circuits through the respective associated transmission apparatuses.

Third, an information transmitting circuit 30 is provided for allowing mutual transfer of information between the configuration control circuits 40 incorporated, respectively, in the individual data transmission apparatuses, and includes command storages 31 ($PR_B$) and 33 ($PR_A$) and command generators 32 ($PG_A$) and 34 ($PG_B$) corresponding to the pair of transmission paths, respectively. The command storage and the command generator are each realized in a structure capable of transferring information in such a format as shown in FIG. 3 among the configuration control circuits 40 in different transmission apparatus and may be implemented in the form of FIFO (First-In, First-Out) registers.

The configuration control circuit 40 cooperates with the corresponding circuits 40 of the identical structure provided in other data transmission apparatuses to detect occurrence of trouble or a fault in the transmission network and/or serve for detection of recovery and controlling of reconstitution or reconfiguration of the transmission network such as disconnection of the location where the trouble is detected from the network and/or restoration from the fault state. The configuration control circuit 40 is mainly composed of a microprocessor 41 (MPU), a memory 42 (MEM), a microcomputer bus 43 and other elements not shown. Command for the route selection to the route change-over circuit 20 and information transfer between the information transmitting circuits 30 of the different transmission apparatus are controlled by the microprocessor 41 through the microcomputer bus 43.

Finally, an access control circuit 50 is provided for allowing the terminals Na to Nm connected to he transmission apparatus under consideration to perform data transmission and reception and is constituted by a transmission frame control circuitry 55 (FRC) serving for the control of generation of the transmission frame and the timing control and terminal access control circuitries 51 ($ACL_1$) to 53 ($ACL_M$) installed for the individual terminals, respectively, and each having an access control function and a terminal interfacing function.

The signal received from a transmission path is delivered to the transmission bus 53 by way of the receiver 21 or 25, the reception multiplexer 24 and the transmission frame control circuit 55 to be supplied to the individual terminal access circuits 51 to 53. This information as well as the signal to be transmitted from the terminal access control circuit is conveyed from the transmission bus 54 to the transmission path by way of the transmission multiplexer 23 or 27 and the transmitter 22 or 26.

The information received by the receiver 21 or 25 is also supplied to the associated command storage 31 or 33 and additionally supplied to the microprocessor 41 through the bus 43 to be thereby identified. On the other hand, the configuration control command issued from the microprocessor 41 is supplied through the bus 43 to the command generator 32 or 34, whereupon the pattern of the configuration command pattern is set at the command generator 32 or 34 to allow the configuration control command to be sent out repetitively. Each transmission multiplexer or selector is adapted to select as the input thereto one of the signals from the command generator circuit, transmission bus and the receiver. The selection of the signal in dependence on the system condition and corresponding configurations of the apparatus will be described in detail hereinafter.

FIG. 3 shows a format for the information transferred between the configuration control circuits of the data transmission apparatuses. There are four types of information as represented by A, B, C and D, respectively, each of a predetermined constant length inclusive of the synchronizing pattern SYN located at the leading end of the format. The information format contains additionally an address field DA for the addresses data transmission apparatus, another address field SA for the sender data transmission apparatus, an information type field TYP and a sub-information field SUB. The aforementioned command storage 31 or 33 detects the synchronization pattern SYN and stores therein the number of data bytes corresponding to the information succeeding to the synchronization pattern SYN. Parenthetically, test information for checking the transmission error is omitted from the illustration.

Figure 4:
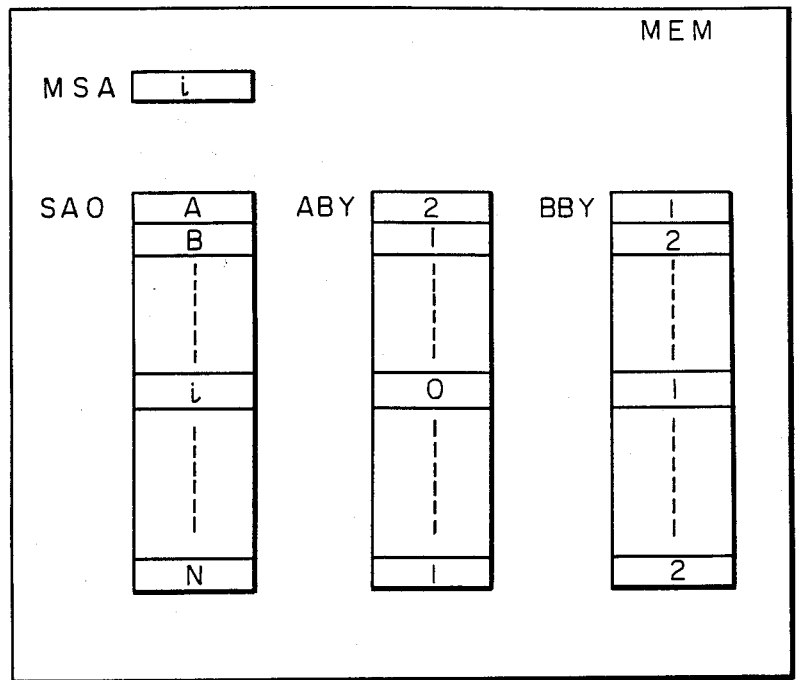
FIG. 4 is a diagram showing a memory map in a storage incorporated in the configuration control circuit.

FIG. 4 is a view illustrating an example of a memory map in the storage 42 incorporated in the configuration control circuit. The storage 42 stores therein at least three types of information required for the configuration control. They are:

(1) address of the associated transmission apparatus (MSA),
(2) a table of addresses of the intra-network transmission apparatuses arrayed in the order in which the apparatuses are connected in the network (SAO), and
(3) tables containing the permissible maximum numbers of stages allowable to be bypassed between the associated transmission apparatus and one located upstream thereof on both transmission paths, respectively (ABY, BBY).

All the tables mentioned above are prepared and stored at the time of establishment of the system. It should be noted that two sorts of tables (ABY, BBY) mentioned above are prepared in view of the fact that a pair of transmission paths for transmission in opposite directions are provided. In a simplified and preferred embodiment of the present invention, the configuration control circuit can be so implemented that the maximum number of station which may to be bypassed in every section is equal to 1. In this case, the tables (ABY, BBY) can be spared, which means that the optical bypass is permitted for one stage, while the bypass over two or more successive stages is inhibited.

Further, the table (SAO) need not always be provided in all the transmission apparatus. Such arrangement can also be adopted in which the table (SAO) is available to only the transmission apparatus serving as the master station.

Next, description will be directed to how the information described above are handled or processed. Upon reception of the type B information shown in FIG. 3 (i.e. the search monitor signal), the sender address information SA contained in this command is checked. By consulting the address table SAO, a memory point having the content which coincides with the sender address information SA mentioned above is detected, whereupon the number of the repeater stations encountered in reaching that sender station is counted. Next, the permissible maximum station bypass number table ABY or BBY is consulted to compare the count value with the preset station number stored in the storage of the transmission apparatus which received this type-B information signal. When the comparison shows that the above-mentioned count value is greater than the preset station number, it is decided that the transmission section of concern is in the normal repeating state.

Figure 5:
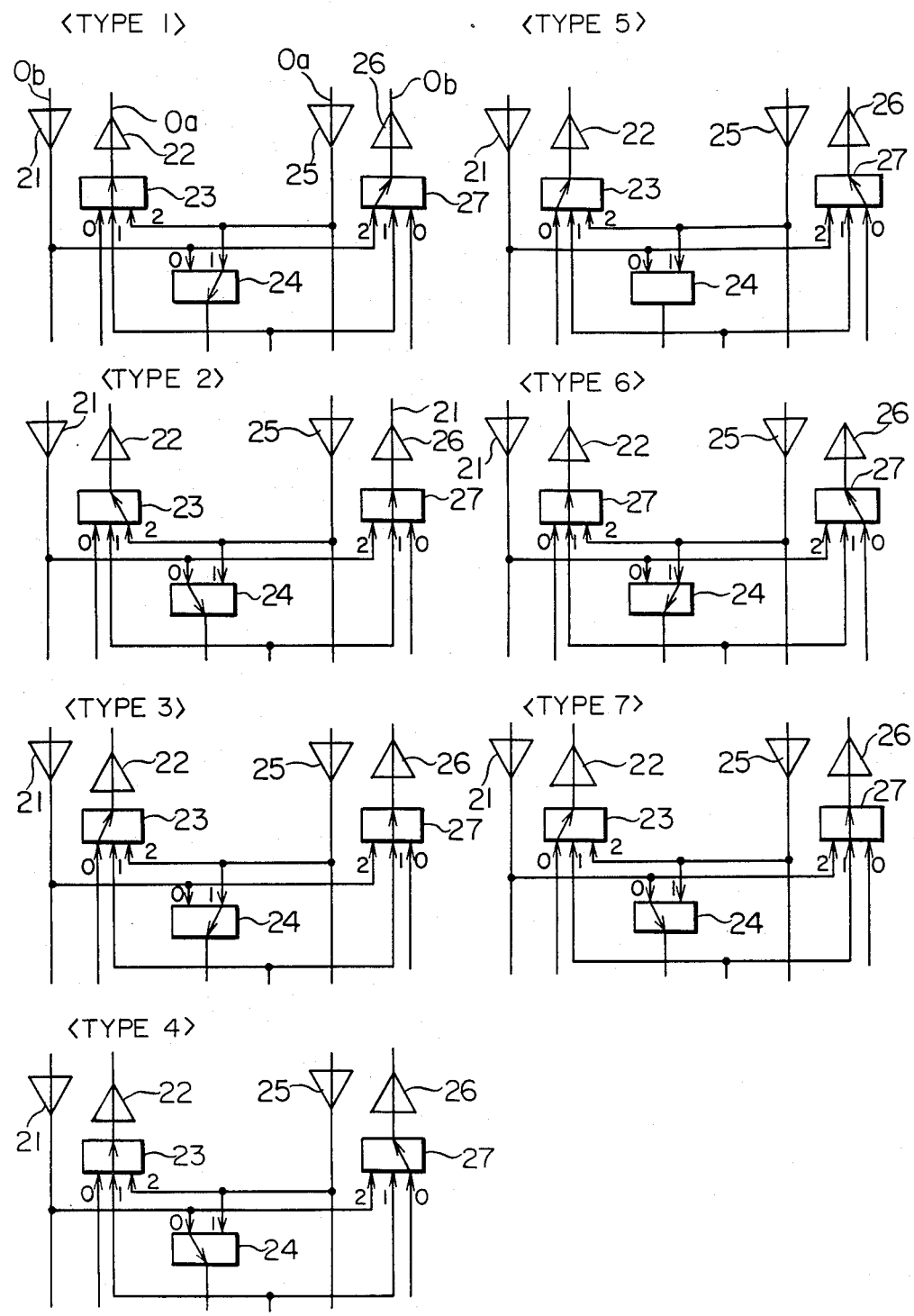
FIG. 5 is a diagram showing a variety of route states which a route change-over circuit incorporated in each transmission apparatus can assume.

FIG. 5 shows, in a list, various types of the routes which the route exchange circuit 20 can assume. The use of these route configuration as well as states of the input signals to the A-path transmission selector (multiplexer) 23, B-path transmission selector 27 and the reception selector 24, respectively, are as follows:

Type 1

Transmission through A-route with B-route being bypassed (1, 2, 1).

Type 2

Transmission through B-route with A-route being bypassed (2, 1, 0).

Type 3

B-to-A loopback (0, 1, 1)

Type 4

A-to-B loopback (1, 0, 0)

Type 5

Sending out through both routes (0, 0, X)

Type 6

Transmission through A-route and sending through B-route (1, 0, 1)

Type 7

Transmission through B-route and sending through A-route (0, 1, 0)

It should be noted that in the transmission and the loopback states mentioned above, the received information is supplied to the transmission bus 54 from the reception selector 24 through the transmission frame control circuit 55, while the sending indicates that of the information generated by the command generator.

Now, description will be turned to operations of the various circuits and units which are triggered in response to occurrence of trouble or fault in the network system. In this connection, it should be recalled that there may be available two different types of systems, i.e. (1) the distributed processing type system in which all the transmission apparatuses are provided with the connecting order-based address table (SAO) and the permissible maximum station bypass number tables (ABY and BBY), and (2) the concentrated processing type system in which only the master station is equipped with these tables SAO, ABY and BBY.

Figure 6:
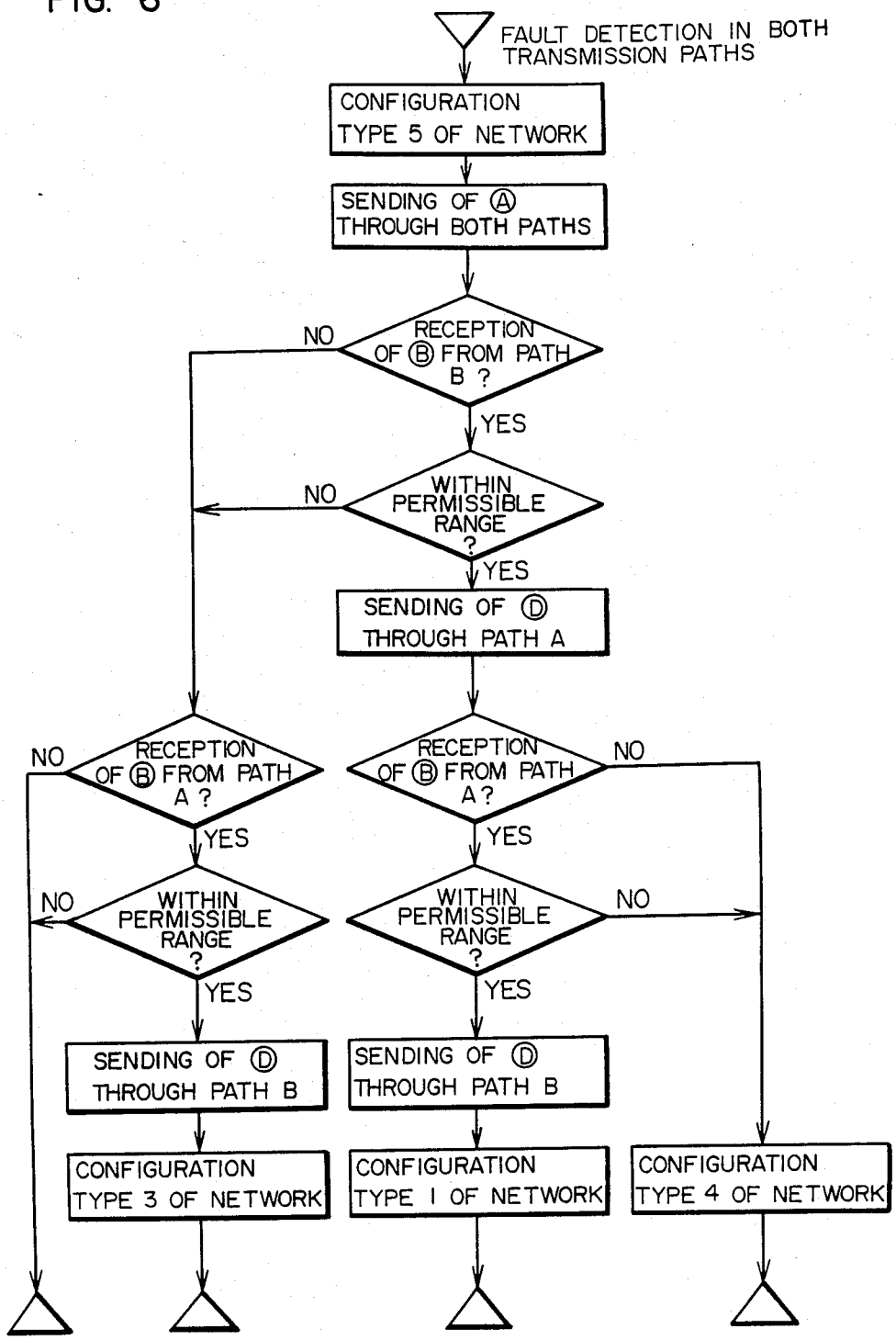
FIG. 6 is a diagram showing in a flow chart, processes executed by the configuration control circuit of the transmission apparatus serving as the master station in one processing mode.
Figure 7:
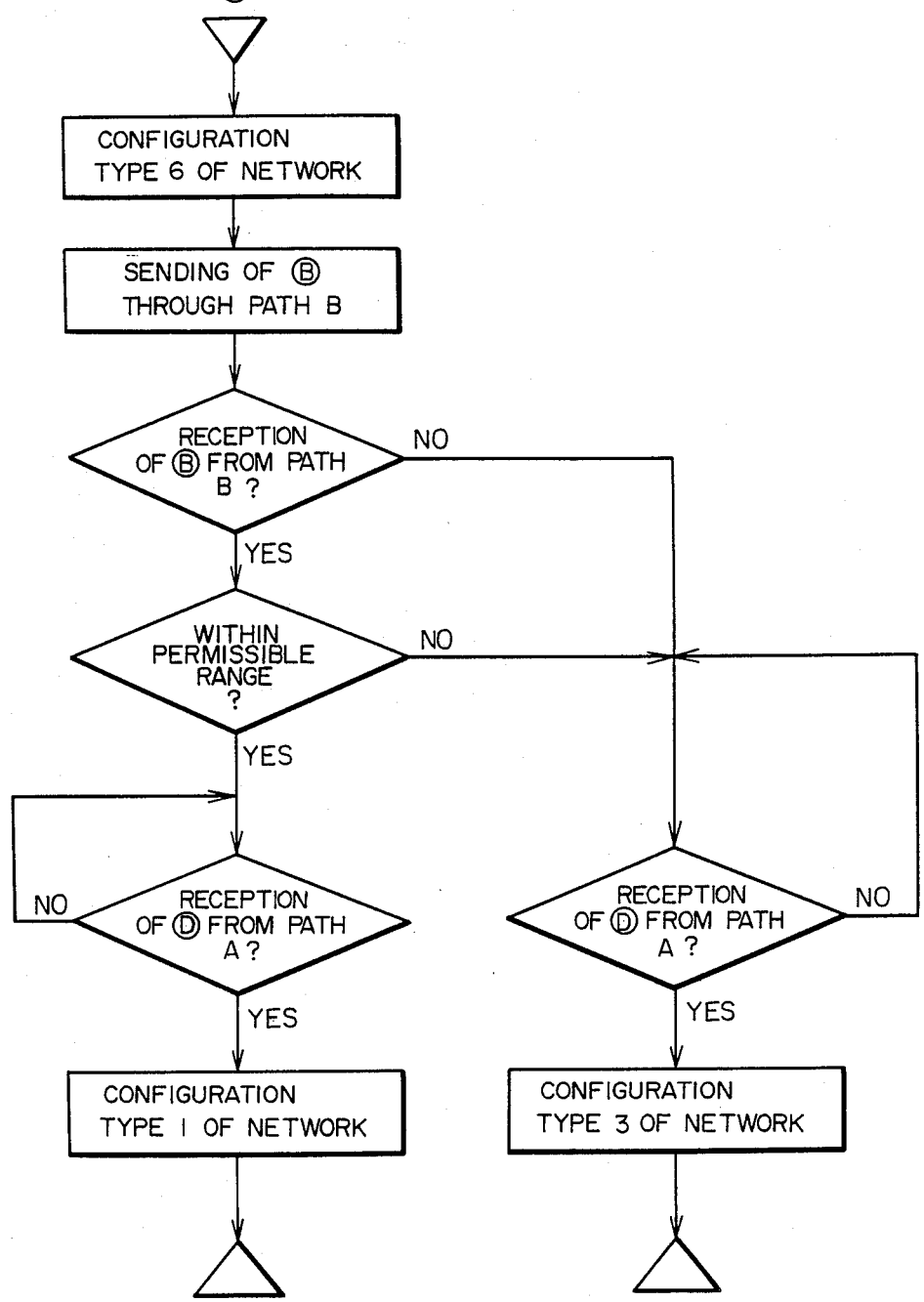
FIGS. 7 and 8 are diagrams showing, respectively, in flow charts, processes executed by the configuration control circuit of the transmission apparatus serving as the slave station in the one processing mode.
Figure 8:
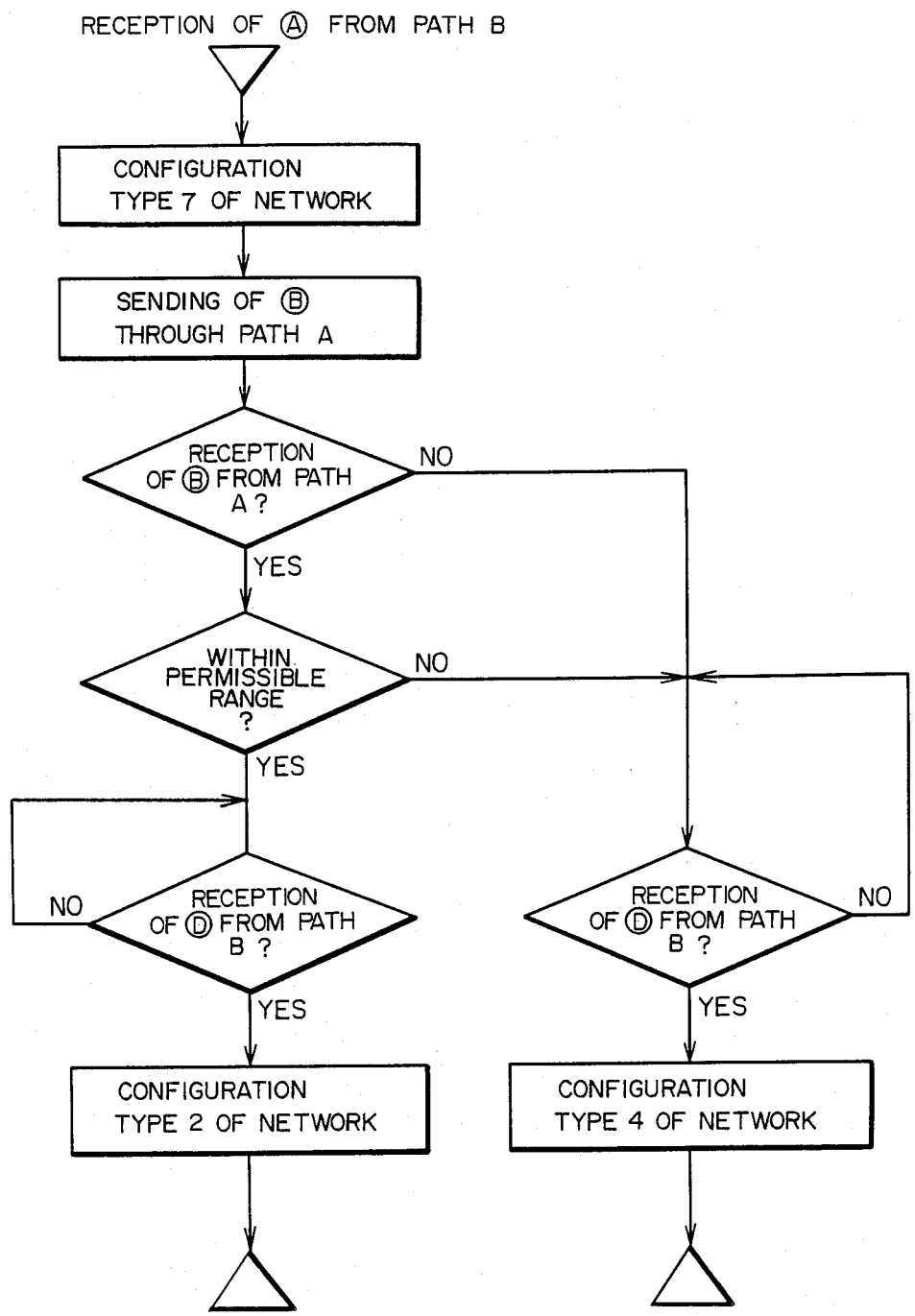

First, the distributed processing type network system will be described. FIG. 6 shows a flow of processes executed by the configuration control circuit 40 of the transmission apparatus serving as the master station in the distributed processing type network system, while FIGS. 7 and 8 show corresponding process flows executed by the configuration control circuits 40 of the transmission apparatuses serving as the slave stations. In this conjunction, it should be mentioned that the master station means the transmission apparatus imparted with a function to control the network configuration, while the slave station means the other transmission apparatus which is not imparted with such a configuration control function, and that both of the transmission apparatuses are implemented in the identical structure when viewed from the standpoint of hardware. Ordinarily, a given one of the transmission apparatuses installed within the network serves as the master station. With this arrangement, the structure of the network can be simplified while assuring high reliability. Of course, appropriate back-up means may be adopted such that a given one of the slave stations can replace the master station when a fault or trouble is detected in the master station itself to thereby mitigate the influence of a fault occurring in the master station.

Upon detection of trouble or fault in both transmission paths, the master station (i.e. master transmission apparatus) assumes the state (type 5 in FIG. 5) in which the fault adjacency search command (command A) is sent out onto both transmission paths.

In response to the reception of this command A, each of the slave stations is set to the state (type 6 or 7 in FIG. 5) in which the search monitor signal (TYP B = in FIG. 3) is sent out onto the transmission path in the direction opposite to the direction in which the command TYP A = (i.e. fault adjacency search command) was received.

Subsequently, the configuration control circuits of the transmission apparatuses inclusive of the master station detect the abovementioned search monitor signal and check the contents thereof.

In the master station, it is required to check both the transmission paths. To this end, the transmission path B is checked and followed by the check of the transmission path A. This check may bring about four different results, as is shown in FIG. 6.

(a) Case in which no monitor signal is received from both transmission paths or otherwise the bypassed station number exceeds the preset value. In this case, it is decided that trouble occurs on both sides of the transmission apparatus under consideration. Consequently, the current searching mode is maintained until the fault is eliminated.

(b) Case in which the normal monitor signal is received only from the transmission path A. In this case, the master station itself is required to serve as the loopback end station. Accordingly, the master station sends out the go-to-loopback command (command TYP 'D in FIG. 3) for establishing the loopback state. Subsequently, the circuit configuration of the type 3 shown in FIG. 6 is established to restart the transmission.

(c) Case in which the normal monitor signal is received only from the transmission path B. In this case, the go-to loopback command (command TYP D in FIG. 3) is sent out onto the path A for establishing the loopback for the path A. Subsequently, the route configuration of the type 4 (FIG. 5) is realized to restart the transmission.

(d) Case in which the normal monitor signal is received from both transmission paths A and B. In this case, the go-to loopback command (command TYP D) is sent out sequentially onto both paths to establish the loop backstate. Subsequently, transmission is restarted in the route configuration of the type 1 (FIG. 5).

In the case of the slave transmission apparatus, the corresponding check brings about four different cases, as follows (refer to FIGS. 7 and 8):

(a) Searching is performed for the fault in the path B (with command received from the path A). When the normal monitor signal is received, the go-to loopback command (command TYP D) from the master station is detected, whereupon the configuration of the type 1 (FIG. 5) is resumed.

(b) When the searching for the fault in the path B results in no reception of the monitor signal or when the number of the repeating stations through which the monitor signal as received has been relayed is out of the preset range, the loopback configuration of the type 3 (FIG. 5) is established in response to the go-to loopback command (command TYP D) from the master station.

(c) When the searching for the fault in the path A is performed (with the command received from the path B) and results in the reception of the normal monitor signal, configuration of the type 2 shown in FIG. 5 is established upon detection of the go-to loopback command (command TYP D) from the master station.

(d) When the searching for fault in the path A results in no reception of the monitor signal or when the number of the repeating stations through the monitor signal has passed is out of the preset range, the loopback configuration of the type 4 shown in FIG. 5 is established upon detection of the go-to loop back command (command TYP D) from the master station.

Figure 9:
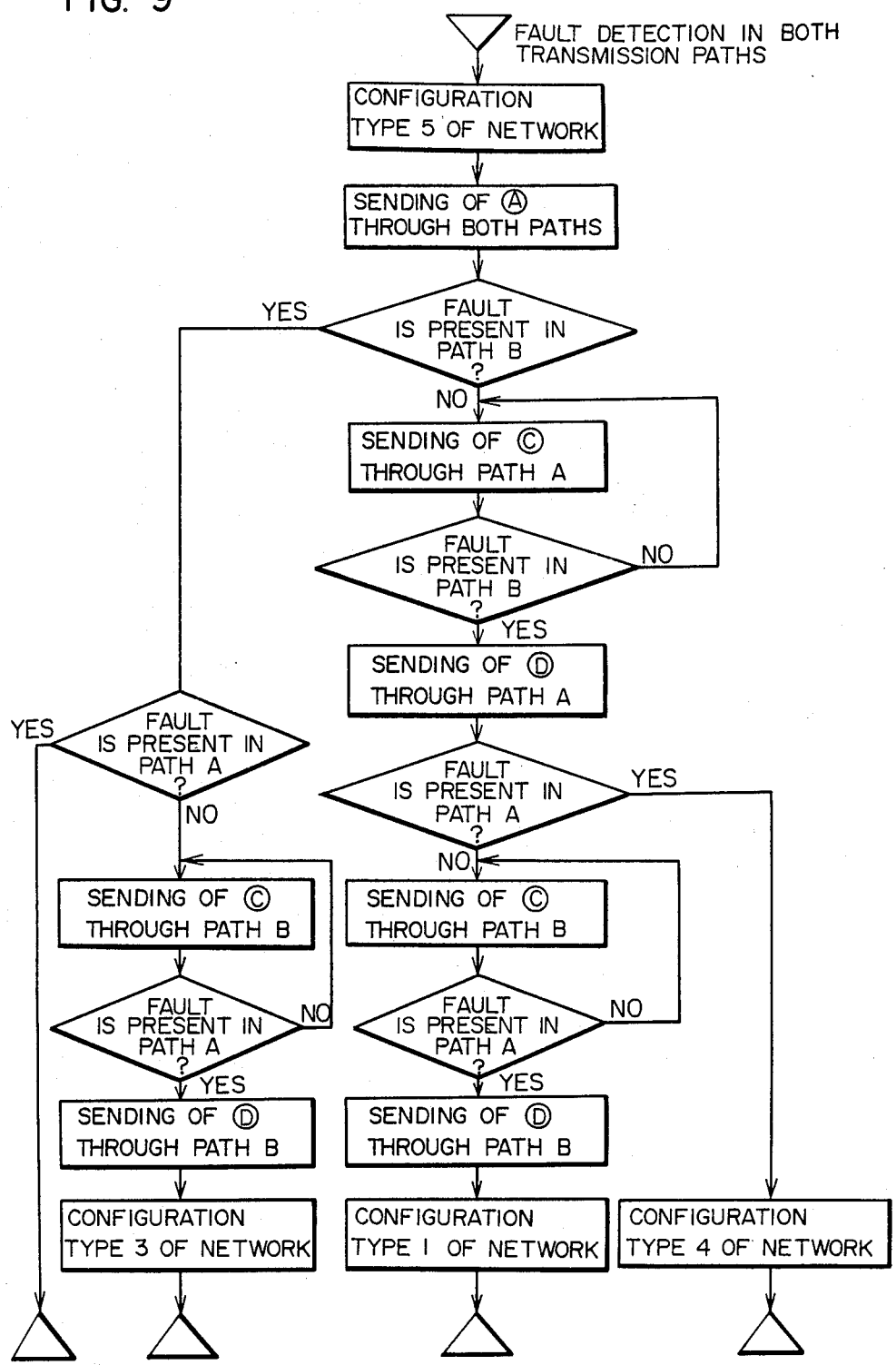
FIG. 9 is a diagram, showing in a flow chart, processes executed by the configuration control circuit of the transmission apparatus serving as the master station in an other processing mode.
Figure 10:
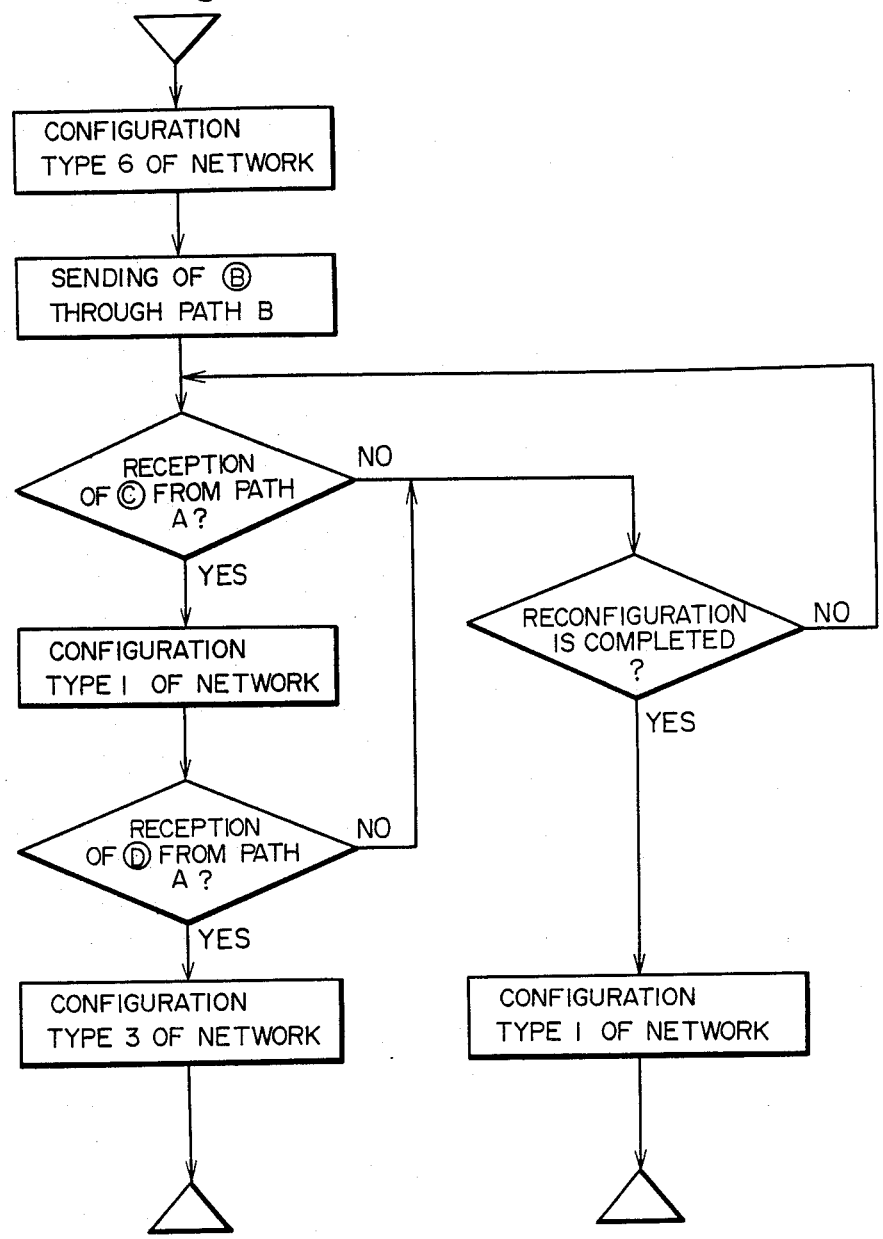
FIGS. 10 and 11 are diagrams, showing in flow charts, processes executed by the configuration control circuit of the transmission apparatus serving as the slave station in the an other processing mode.
Figure 11:
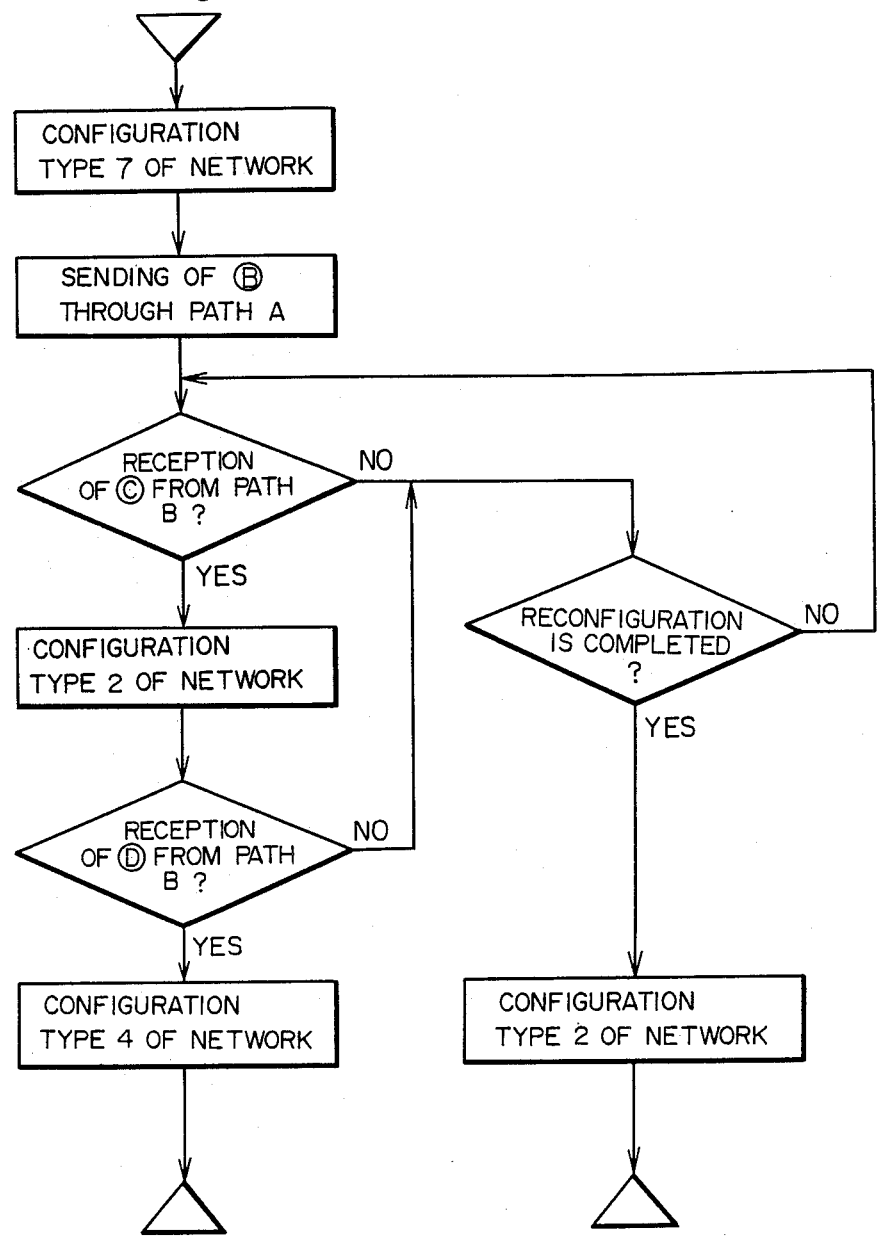

Next, a description will be given of the concentrated type processing operation by referring to FIGS. 9, 10 and 11, in which FIG. 9 shows processes executed by the master station (master transmission apparatus), and FIGS. 10 and 11 show processes executed by the slave station.

Upon a detection of a fault in both transmission paths, the master station assumes the state of the type 5 shown in FIG. 5 in which the fault adjacency search command (command TYP A) is sent out onto both transmission paths.

In response to the reception of the fault adjacency search command, each of the slave stations assumes the state of the type 6 or type 7 to send out the search monitor signal (command TYP B) onto the transmission path opposite to that through which the fault adjacency search signal (command TYP A) was received.

Subsequently, the master station detects the abovementioned monitor signal and checks the contents thereof to specify the location where fault takes place.

In the master station, the two transmission paths are supervised sequentially, whereby four cases will be resulted from the supervision, as mentioned below:

(a) Case where no monitor signal is received from both transmission paths or otherwise the number of the stations which were bypassed by the monitor signal exceeds the prescribed value. In this case, the current searching state is maintained until the fault is removed.

(b) Case where the normal monitor signal is received only from the transmission path A. In this case, it is required that the master station itself functions as the loop backend. The master station then sends out through the transmission path B the search stop command (command TYP C) to the slave transmission apparatus (slave station) which issued the abovementioned monitor signal and checks the succeeding section in the similar manner. When a faulty location is finally detected, the master station issues the go-to loopback command (command TYP D) to complete disconnection of the faulty location, which is then followed by the transition to the configuration of the type 3 to restart the transmission.

(c) Case where the normal monitor signal is received only from the transmission path B. In this case, the search stop signal (command TYP C) is sent out through the transmission path A to the transmission apparatus which issued the abovementioned monitor signal and checks the succeeding stations sequentially in the similar manner. When a faulty location is finally detected, the go-to loopback command (command D) is issued to the transmission apparatus located adjacent to the faulty location to thereby complete the network reconfiguration. Subsequently, the transmission state of the type 4 shown in FIG. 5 is resumed to allow the transmission to be restarted.

(d) Case in which the normal monitor signal is received from both the transmission paths. In this case, the loopback state is created sequentially for each of the transmission paths through the similar procedure as mentioned in conjunction with the cases (b) and (c). Thereafter, the configuration of the type 1 shown in FIG. 5 is established to allow the transmission to be restarted.

In the slave station, there arise four situations mentioned above (a) Case in which the go-to loopback command (command TYP D) addressed to the very transmission apparatus which sent out the monitor signal (command TYP B) to the transmission path B is not received by that transmission apparatus through the transmission path A. In this case, the configuration of the type 1 shown in FIG. 5 is resumed at the time when the other transmission apparatus serving as the master station has completed the network reconfiguration operation in response to the reception of the go-to loopback command addressed to other transmission apparatus.

(b) Case where the go-to loopback command (command TYP D) issued by the master station is received by the very transmission apparatus that sent out the monitor signal to the path B. In this case, the loopback state of the type 3 shown in FIG. 5 is assumed, waiting for the restart of transmission.

(c) Case where the go-to loopback command is not received by the very transmission apparatus that sent out the monitor signal (command TYP B) to the path A. In this case, the configuration of the type 2 shown in FIG. 5 is resumed and the restart of transmission is waited for.

(d) Case in which the go-to loopback command (command TYP D) issued by the master station is received by the very transmission apparatus that sent out the monitor signal (command TYP B) onto the path A. In this case, the loopback configuration of the type 4 shown in FIG. 5 is established, wherein the restart of transmission is waited for.

In the foregoing, the present invention has been described on the assumption that a faulty location which causes a plurality of stations to be successively bypassed to thereby render the transmission in the associated section unstable is to be disconnected. It should, however, be understood that the concept of the present invention can equally be applied to the opposite case where the disconnected section is restored to the network system after the fault has been eliminated. In this case, the arrangement may be made such that the transmission apparatus to be restored from the bypassed state issues information including the address of that transmission apparatus, wherein the loopback end station which receives the abovementioned information or alternatively the master station which receives the message of the reception of that information from the loopback end station can perform the detection of the permissible bypassed station number and the decision in the similar manner as described hereinbefore.

We claim:

1. A method of detecting a faulty location in a ring network system including a plurality of transmission apparatuses, terminals connected to each of said transmission apparatuses and double ring transmission paths for interconnecting said transmission apparatuses in a ring-like configuration so that any given ones of said terminals can communicate with each other by way of the respective associated transmission apparatuses, comprising the steps of:
  searching address of adjacent one of said transmission apparatuses;
  determining arithmetically the stage numbers of bypassed transmission apparatuses on the basis of said address of said adjacent transmission apparatus and predetermined addresses indicating an order in which the transmission apparatuses are connected; and
  comparing said arithmetically determined number of bypassed transmission apparatuses with a predetermined maximum number of the transmission apparatuses allowable to be bypassed to thereby detect the faulty location in said ring network system.

2. A method of detecting a faulty location in a ring network system including a plurality of transmission apparatuses, terminals connected to each of said transmission apparatuses and double ring transmission paths for interconnecting said transmission apparatuses in a ring-like configuration so that any given ones of said terminals can communicate with each other by way of the respective associated transmission apparatuses, wherein each of said transmission apparatuses includes bypass means for causing said ring transmission path to bypass the transmission apparatus, route change-over means for changing over connecting relation between said transmission apparatus and said double-ring transmission path, configuration control means for controlling indexing operation for indexing a faulty location and information transfer means for performing information transfer with the configuration control means of other transmission apparatus,
  said method comprising steps of:
  searching the address of the adjacent transmission apparatus;
  collating said searched address with address information arrayed in a predetermined order in which the transmission apparatuses are connected in said ring network to thereby determine the number of stages bypassed before reaching said adjacent transmission apparatus; and
  comparing the number of the bypassed stages with a predetermined number of stages allowed to be bypassed to thereby detect the faulty location in said ring network;
  said steps being carried out under the control of said configuration control means.

3. A method of detecting a faulty location in a ring network according to claim 2, the search of the address of the adjacent transmission apparatus being realized in such a manner that said configuration control means sends out information containing the address of the associated transmission apparatus to the configuration control means of all the outer transmission apparatuses, wherein the address contained in the information received by the configuration control means is regarded as the address of the adjacent transmission apparatus.

4. A method of detecting a faulty location in a ring network according to claim 2, wherein said configuration control means detects that the number of the bypassed stages exceeds said predetermined number of stages allowed to be bypassed, said configuration control means issues a command to said route change-over means for disconnecting the corresponding transmission apparatus from said ring network.

5. A data transmission system comprising a ring network of a plurality of transmission apparatuses, at least one terminal connected to each of said transmission apparatuses and double ring transmission paths for interconnecting said transmission apparatuses in a ring-like configuration so that any given ones of said terminals can communicate with each other by way of their respective associated transmission apparatuses and said transmission paths, wherein each of said transmission apparatuses includes means for causing said ring transmission path to bypass the transmission apparatus, means for changing over connecting relation between said transmission apparatus and said double-ring transmission path, means for controlling said means for changing over and for indexing an operation for locating a faulty portion, and means for performing an information transfer with the means for controlling of other transmission apparatuses, means for storing the order in which the transmission apparatuses are connected in said ring network, and means for searching the address of the currently adjacent transmission apparatus, means for collating the searched address with address information arrayed in a predetermined order in which the transmission apparatuses are connected in said ring network to thereby determine the number of stages bypassed before reaching said currently adjacent transmission apparatus, and means for comparing the number of the bypassed stages with a predetermined number of stages allowed to be bypassed to thereby detect the faulty portion within said ring network.

6. A data transmission system according to claim 5, further comprising means for sending out information containing the address of the associated transmission apparatus to the means for searching of all the other transmission apparatuses, wherein the address contained in the information received by the means for searching is regarded as the address of the adjacent transmission apparatus.

7. A data transmission system according to claim 5, wherein when said means for comparing detects that the number of the bypassed stages exceeds said predetermined number of stages allowed to be bypassed, said means for controlling issues a command to said route change-over means for disconnecting the corresponding transmission apparatus from said ring network.

8. A data transmission system according to claim 5, wherein said storage means stores therein a predetermined maximum permissible number of stages allowable to be bypassed before reaching the currently adjacent transmission apparatus.

9. A data transmission system according to claim 5, wherein collation is performed for determining whether said number of the by-passed stages is greater than said predetermined permissible number of stages allowable to be by-passed.

* * * * *

UNITED STATES PATENT AND TRADEMARK OFFICE
CERTIFICATE OF CORRECTION

PATENT NO. : 4,855,993
DATED : 8 August 1989
INVENTOR(S) : Takuji HAMADA et al.

It is certified that error appears in the above-identified patent and that said Letters Patent is hereby corrected as shown below:

| Column | Line | |
|---|---|---|
| ABS. | 18 | Change "ae" to --are--. |
| 1 | 22 | Delete "reconstituting". |
| 1 | 23 | Change "system, is" to --system is--. |
| 1 | 32 | Change "station the faulty station," to --station is a faulty location,--. |
| 2 | 29 | After "against" delete "the". |
| 2 | 52 | Change "showing" to --showing,--. |
| 2 | 64 | Change "an other" to --another--. |
| 2 | 68 | Change "the an other" to --another--. |
| 3 | 10 | After "referred to" insert --as--. |
| 3 | 53 | After "trouble" insert --or--. |
| 3 | 68 | After "for example" insert --,--. |
| 4 | 1 | After "demolution" insert --,--. |
| 5 | 21 | Delete "suc-". |
| 5 | 22 | Delete "ceeding" and insert --derived from--. |
| 5 | 49 | Change "station" to --stages--; after "may" delete "to". |
| 6 | 11 | Change "configuration" to --configurations--. |

UNITED STATES PATENT AND TRADEMARK OFFICE
CERTIFICATE OF CORRECTION

PATENT NO. : 4,855,993

DATED : 8 August 1989

INVENTOR(S) : Takuji HAMADA et al.

It is certified that error appears in the above-identified patent and that said Letters Patent is hereby corrected as shown below:

| Column | Line | |
|---|---|---|
| 8 | 18 | Before "fault" insert --a--. |
| 8 | 20 | After "through" insert --which--. |
| 8 | 46 | Delete "be". |
| 8 | 47 | Change "resulted" to --result--. |
| 10 | 65 | Change "outer" to --other--. |
| 12 | 30 | Delete "permissible"; change "allowable" to --allowed--. |

Signed and Sealed this

Twenty-ninth Day of October, 1991

Attest:

HARRY F. MANBECK, JR.

*Attesting Officer*  *Commissioner of Patents and Trademarks*